United States Patent [19]

Holland

[11] Patent Number: 5,320,649
[45] Date of Patent: Jun. 14, 1994

[54] PLANT TRANSPLANT SYSTEM

[76] Inventor: James J. Holland, 147 Cook St., Allegan, Mich. 49010

[21] Appl. No.: 931,927

[22] Filed: Aug. 18, 1992

[51] Int. Cl.$^5$ .............................................. A01C 11/02
[52] U.S. Cl. ...................................... 47/1.01; 47/901; 111/105
[58] Field of Search ................. 111/105, 104; 47/1 A, 47/1.01, 901

[56] References Cited

U.S. PATENT DOCUMENTS

| | | |
|---|---|---|
| 3,820,480 | 6/1974 | Blackmore et al. . |
| 4,130,072 | 12/1978 | Dedolph . |
| 4,289,080 | 9/1981 | Penley . |
| 4,355,588 | 10/1982 | Armstrong et al. . |
| 4,388,035 | 6/1983 | Cayton et al. . |
| 4,408,549 | 10/1983 | Qvarnstrom . |
| 4,443,151 | 4/1984 | Armstrong et al. . |
| 4,750,439 | 6/1988 | de Groot ............................ 111/105 |
| 4,893,571 | 1/1990 | Hakli et al. . |
| 4,947,579 | 8/1990 | Harrison et al. . |
| 5,048,434 | 9/1991 | Forster et al. . |
| 5,121,955 | 6/1992 | Visser .............................. 111/104 |
| 5,215,550 | 6/1993 | Tesch ............................... 111/104 |

FOREIGN PATENT DOCUMENTS

| | | | |
|---|---|---|---|
| 2580457 | 10/1986 | France ............................ 47/1 A |
| 2610786 | 8/1988 | France ............................ 47/1 A |
| 9000803 | 11/1993 | Netherlands .................... 47/1 A |
| 77223 | 10/1986 | Norway . | |
| 704503 | 7/1984 | U.S.S.R. . | |
| 520535 | 4/1940 | United Kingdom ............. 111/104 |
| 3907 | 3/1992 | World Int. Prop. O. .......... 47/901 |

*Primary Examiner*—Henry E. Raduazo

[57] ABSTRACT

A system for transplanting plants from a seedling tray to a plant tray includes a gripper head having gripper arms which are selectively movable between gripping and release positions. The gripper head moves in combination with a pusher assembly which pushes the plug out of the seedling tray. A frame mounts the gripper head and pusher assembly for movement relative to a seedling tray. The gripper head includes a number of unique features, ensuring that the gripper head gently grips the plant plug, such that the plant plug is not damaged. Further, the pusher assembly "sweeps" a plug out of the compartment such that the gripper head may grip it. In further embodiments, plural units may be used in combination to increase the speed of operation of the inventive system.

12 Claims, 5 Drawing Sheets

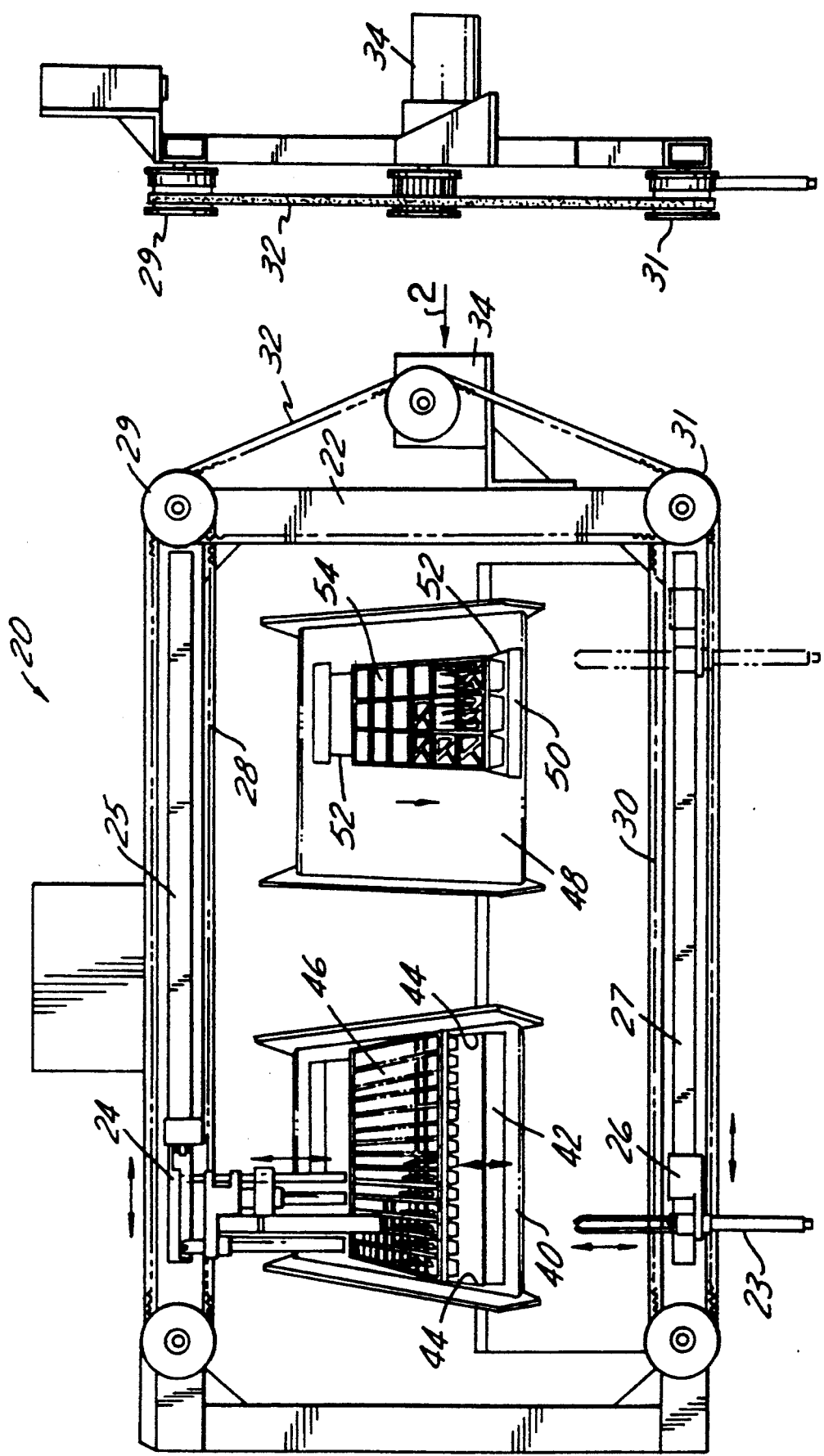

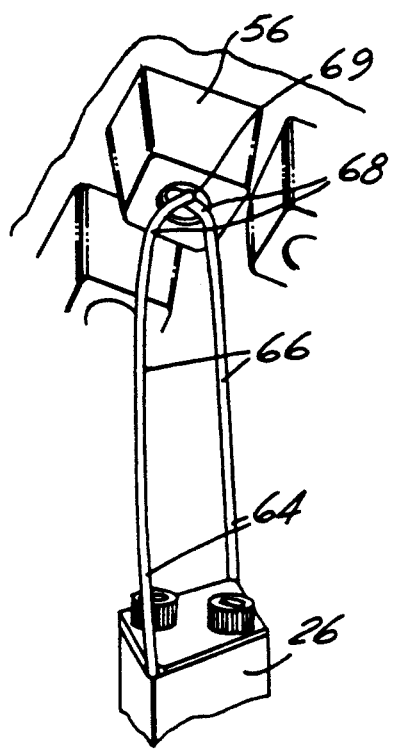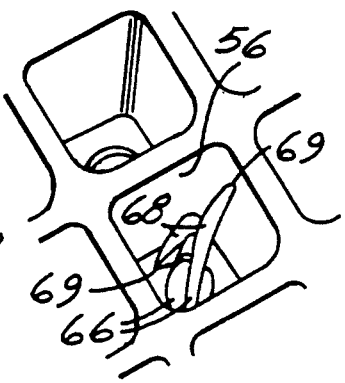
FIG.3  FIG.4  FIG.5
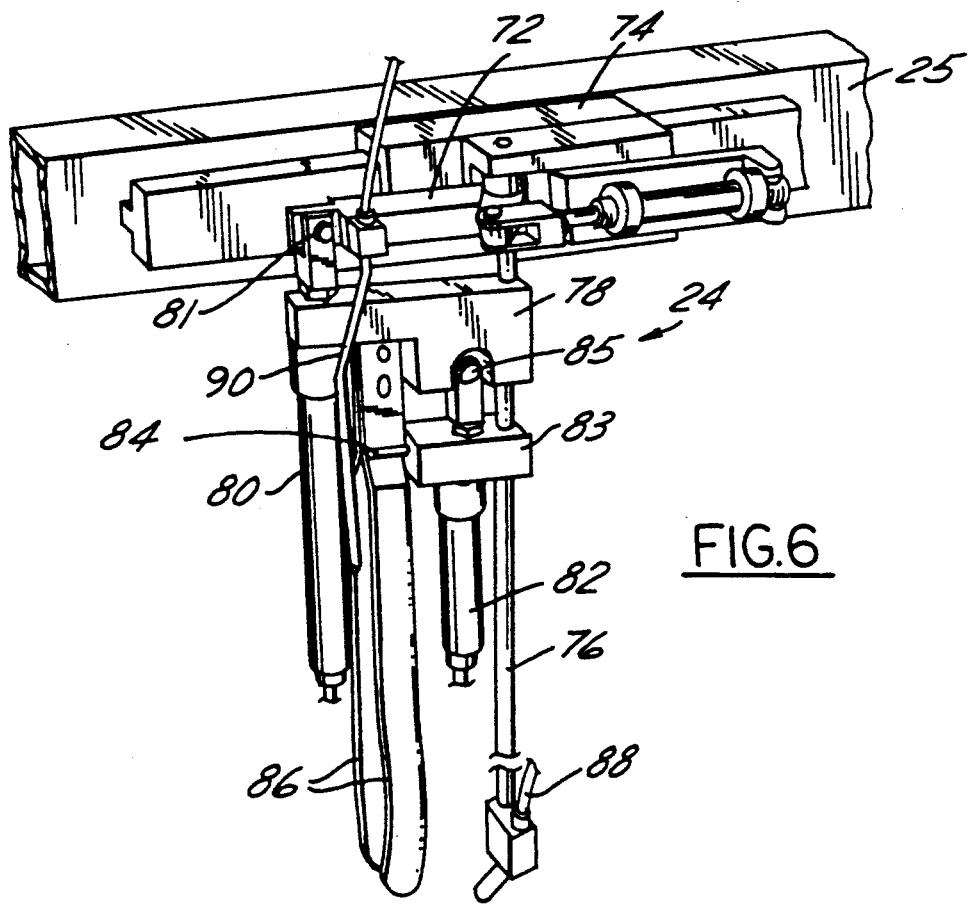
FIG.6

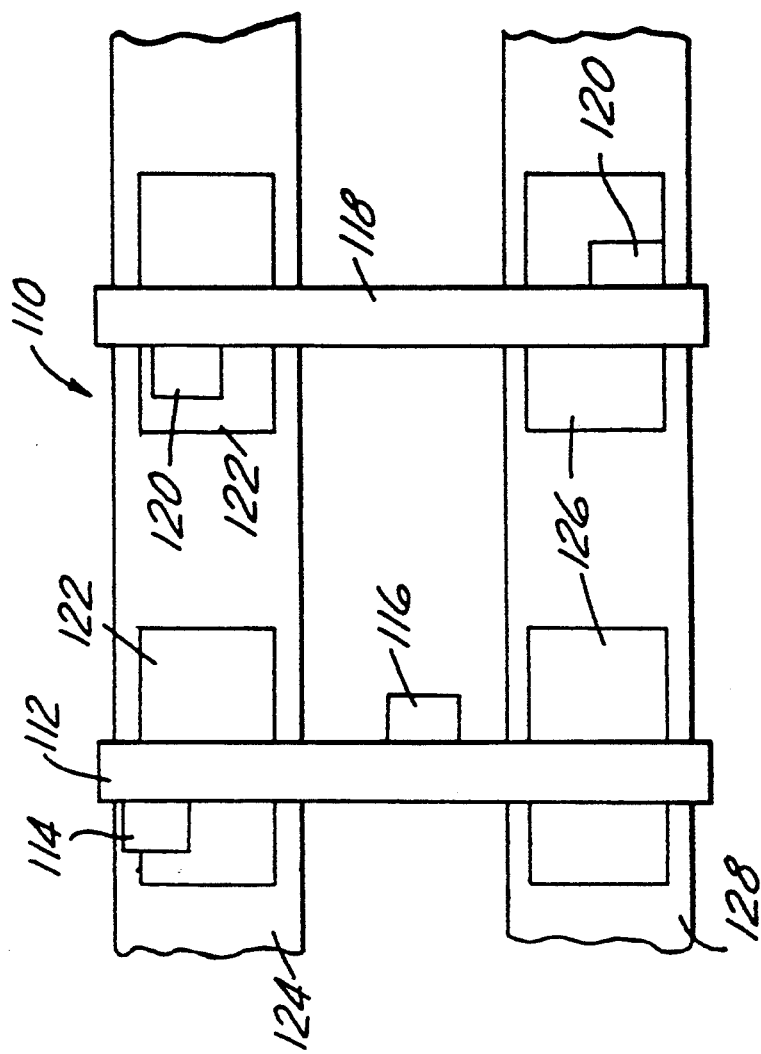
FIG. 14
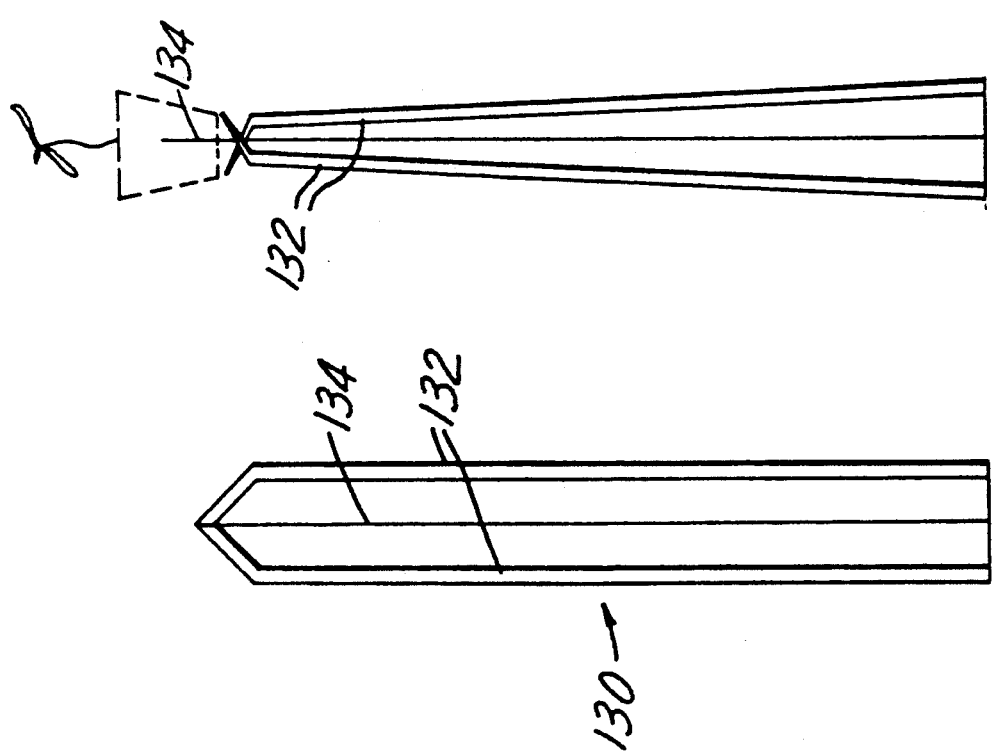
FIG. 13B
FIG. 13A

PLANT TRANSPLANT SYSTEM

BACKGROUND OF THE INVENTION

The present invention relates to a system for transplanting young plants from seedling trays to larger trays.

In the prior art, complicated systems have been developed to transplant plants from a seedling plug tray, where they have initially germinated, to a larger flat tray where they will have more room to grow. These systems have been unduly complicated, and have sometimes injured the seedlings. These systems have also not been able to rapidly transplant the large number of seedling in a typical seedling tray.

Further, the prior art has not been easily adaptable for use with varying trays and plants. Also, in the prior art, pointed members have often been used to force the seedlings out of the seedling tray compartments. These pointed members have sometimes damaged the young seedlings and their roots.

It would be desirable to develop a plant transplant system which can quickly and accurately transplant plants from a seedling tray to a larger tray. Further, it would be desirable to develop such a system which can transplant the plants without damaging the seedlings. It would also be desirable to develop such a system which is adaptable to various sizes and types of trays and plants.

SUMMARY OF THE INVENTION

In a disclosed embodiment of the present invention a frame carries a gripper head and a pusher along a row of the seedling tray. The pusher is actuated to push a seedling out of a seedling compartment, and the gripper head is then actuated to grip the seedling. The gripper head then moves on the frame to a position where it overlies the larger tray, and inserts the seedling into a larger tray compartment.

In preferred features of the present invention, the gripper head consists of two gripper arms having lower generally parallel sections, and upper angled sections which extend to a contact point. Actuating pins move relative to these gripper arms, and cam the gripper arms between gripping and release positions.

Further, the entire gripper head can preferably pivot relative to the frame such that the gripper arms can be moved to be utilized with both triangular-shaped trays, and rectangular-shaped tray compartments. A photo eye may be positioned on the gripper head to determine whether a seedling has been removed from the particular compartment. Since seedling sometimes die, the eye will determine if a particular seedling compartment does not have a live plant. If not, the seedling plug is moved to a waste position, where it is released. In this way, space in the larger tray is not utilized for plugs which do not contain live plants.

In a further preferred feature of the present invention the pusher arm consists of two spring arms which have lower parallel sections extending to upper angled portions, which meet at a tip. The tip of the two angled portions is selectively aligned with the drainage hole at the bottom of the seedling tray compartment. The arms are then moved upwardly into the hole. As the angled portions move through the hole, and the parallel portions begin to move into the hole, the spring arms are forced to cross each other. The upper angled portions then move with a sweeping movement under the seedling plug, lifting the seedling plug out of the seedling tray compartment and stabilizing the seedling. This is an improvement over the prior art which used a pointed member which would often damage the roots of the seedling.

In further features of the present invention, tile frame may mount a gripper head on each lateral side such that two units transplant seedlings at the same time. Further, it is envisioned that several such frames can be utilized in a single system to increase the speed with which the unit operates.

These and other features of the present invention can be best understood from the following specification and drawings, of which the following is a brief description.

BRIEF DESCRIPTION OF THE DRAWINGS

FIG. 1 is a partially schematic view of a system for transplanting plants.

FIG. 2 is a view looking along line 2 as shown in FIG. 1A.

FIG. 3 is a perspective view of a pusher according to the present invention.

FIG. 4 is a perspective view of the removal of a seedling plug.

FIG. 5 is a perspective view showing the action of the pusher arms.

FIG. 6 is a perspective view of the gripper head according to the present invention.

FIG. 13a shows an alternative pusher arrangement,

FIG. 13b is a view similar to FIG. 13a.

FIG. 14 a partially schematic view showing a incorporating plural units according to the present invention,

DETAILED DESCRIPTION OF A PREFERRED EMBODIMENT

Figure 7:
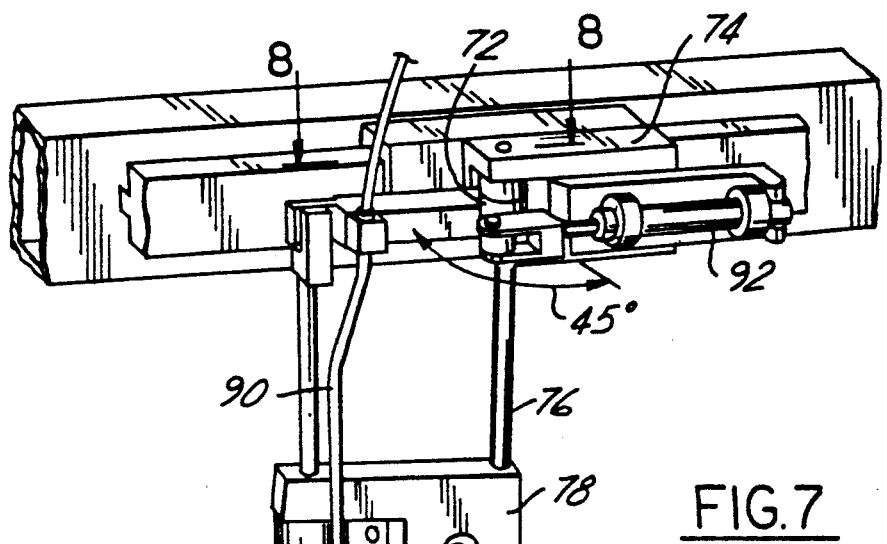
FIG. 7 is a perspective view of the gripper head as shown in FIG. 6 in a gripping position.

FIG. 1 is a partially schematic view of a system 20 for transplanting seedlings from a seedling tray to a plant tray. A frame 22 mounts a gripper head 24 and a pusher 26. A cylinder 23 actuates the pusher 26 to move vertically. Gripper head 24 moves along track 25, while pusher assembly 26 moves along track 27. A belt 28 drives gripper head 24 along track 25, while a belt 30 moves pusher assembly 26 along track 27. A wheel 29 drives belt 28, while a wheel 31 drives belt 30. A belt 32 drives both wheels 29 and 31. An electronically controlled motor 34 drives belt 32, which acts as a timing mender to ensure that gripper head 24 and pusher assembly 26 are always aligned.

A platform 40 has a conveyor 42 with members 44 pulling seedling tray 46 along platform 40. Similarly, a platform 48 includes a conveyor 50 with members 52 pulling a plant tray 54 along platform 48. The conveyors are known in the art and are thus shown schematically.

As a seedling tray 46 moves along platform 40, pusher assembly 26 removes the seedling plugs, and gripper head 24 grips them. Motor 34 then moves gripper head 24, and may also move pusher assembly 26, such that gripper head 24 overlies a compartment in plant tray 54. Gripper head 24 then transplants the plant into plant tray 54.

As shown in FIG. 2, motor 34 drives belt 32, which in turn drives wheels 29 and 31. This provides a simple arrangement such that pusher assembly 26 is always aligned with gripper head 24.

Figure 1B:
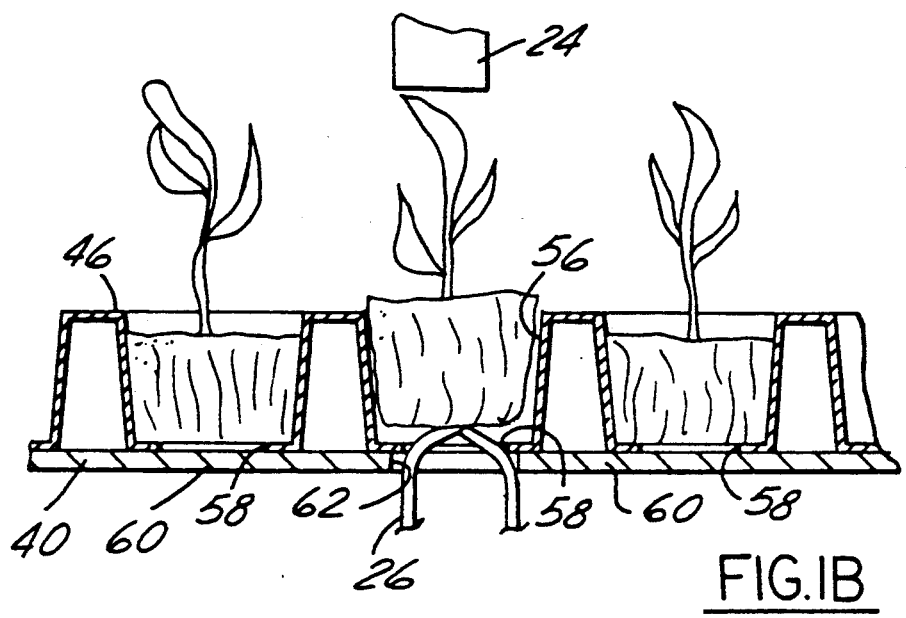
FIG. 1B is a cross-sectional view through a portion of the system shown in FIG. 1.

FIG. 1B is a cross-sectional view through platform 40, and shows a compartment 56 in seedling tray 46. As shown, compartment 56 has a drainage hole 58 at the bottom. Platform 40 is stationary and formed of two separate portions 60 having a gap 62 between the two. The conveyor 42 with members 44 moves tray 46 along platform 40. Gripper head 24 and pusher assembly 26 do not move to tile left and right as shown in this figure. Rather, the movement of the gripper head 25 and pusher assembly 26 is into and out of the plane of this figure. The conveyor moves seedling tray 46 to the left and right, and indexes the tray such that the seedlings in the various rows can be removed. When it is desired to remove the seedling from compartment 56, pusher assembly 26 is actuated in a manner to be explained below, and forces the seedling plug out of compartment 56. It is then gripped by gripper head 24.

As shown in FIG. 3, gripper assembly 26 consists of two spring arms 64 having generally parallel lower portions 66 leading to upper angled portions 68 which extend to end points 69 which are adjacent each other in a relaxed position. As shown, the two end points 69 fit within drainage hole 62 of compartment 56. In one embodiment, the spring arms were formed of 0.070" spring wire, and the angled portion extended at a 45° angle from the lower portion.

A cylinder 23, see FIG. 1, forces pusher assembly 26 vertically upwardly to the position shown in FIG. 4. Iu this position, upper angled portions 68 have swept beneath a seedling plug 70 that was received within compartment 56. The gripper head can now grip the seedling plug 70.

As shown in FIG. 5, as the parallel lower portions 66 begin to move into drainage hole 62, they are forced to cross each other. This leads to a sweeping action of the upper angled portions 68, which slides beneath and stabilize the seedling plug 70 (see FIG. 4), and gently lifts it out of the compartment 56. As shown, end points 69 are chamfered to facilitate entrance into drainage hole 62.

Details of gripper head 24 are shown in FIG. 6. As shown, a slide 74 is received on track 25, and a top block 72 pivots on rod 76 relative to slide 74. A middle block 78 may move vertically along rod 76 under the action of cylinder 80 which is connected at 81 to top block 72. When a seedling is gripped, gripper head 24 is moved along track 25 such that it overlies the plant tray. The middle block 78 is then moved vertically downwardly and the plant is placed in a compartment in the plant tray.

A cylinder 82 moves a lower block 83 which carries pin 84, and two other pins, not shown in this figure, to cam gripper arms 86 and squeeze or release a seedling plug. Cylinder 82 is connected at 85 to middle block 78. A water supply line 88 is mounted adjacent rod 76 to supply water to a tray to make the transplanting of the seedling plug easier. A fiber optic photo eye 90 determines whether a live seedling is in the plug which has been gripped by gripper arms 86. If no live seedling is in the plug, the gripper head can be moved over a waste compartment where the plug of dirt is dropped. This reduces wasted space in the plant tray.

As shown in FIG. 7, lower block 83 has been moved downwardly relative to middle block 78 to actuate the gripper arms 86 to grip seedling plug 70. Gripper head 24 is then moved along track 25 to overlie the plant tray.

Figure 8:
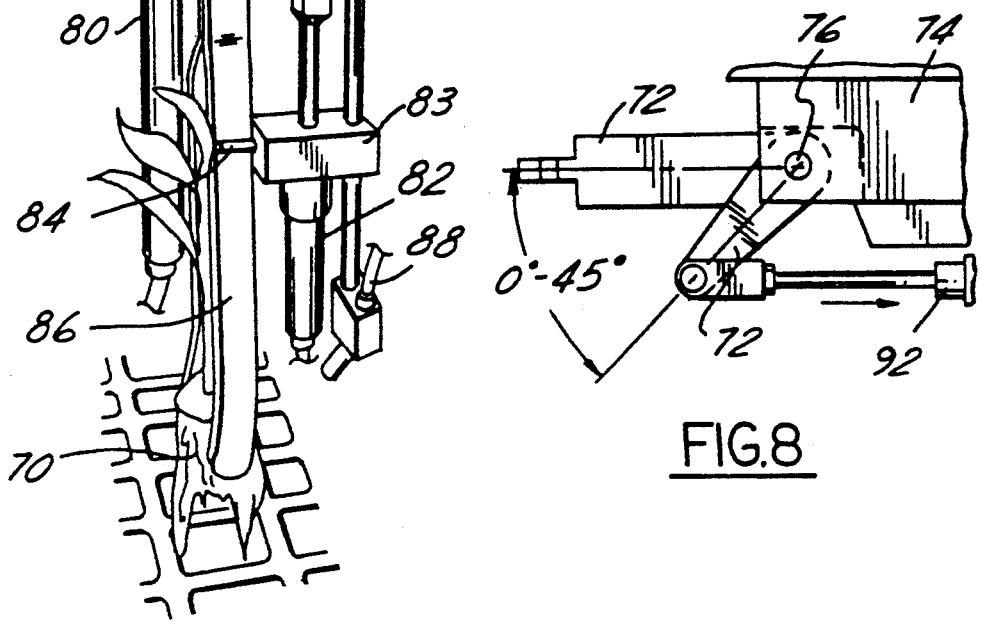
FIG. 8 is a cross-sectional view along line 8—8 as shown in FIG. 7.

As shown in FIG. 8, middle block 72 may pivot about rod 76 relative to slide 74. This may be necessary if one of the trays which are being either used as a seedling or a plant tray has triangular compartments. This will be explained below. A cylinder 92 drives middle block 72 to pivot on rod 76. In one embodiment the pivot range is 45°.

Figure 9:
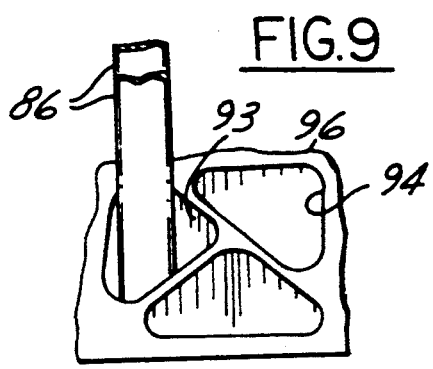
FIG. 9 is a perspective view showing the action of the gripper head.
Figure 10:
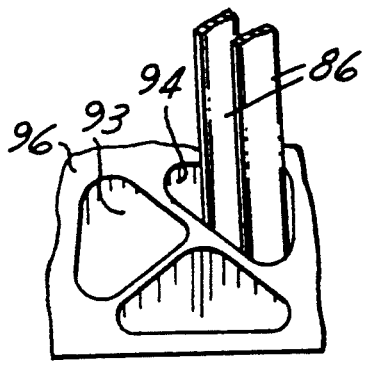
FIG. 10 is a view similar to that shown in FIG. 9.

As shown in FIG. 9, when the plant tray includes triangular compartments 93 and 94, such as shown in plant tray 96, the gripper arms 86 can move into tray compartment 93, and then as shown in FIG. 10, the gripper arms 86 can be rotated when the next plant is inserted into plant compartment 94.

Figure 11:
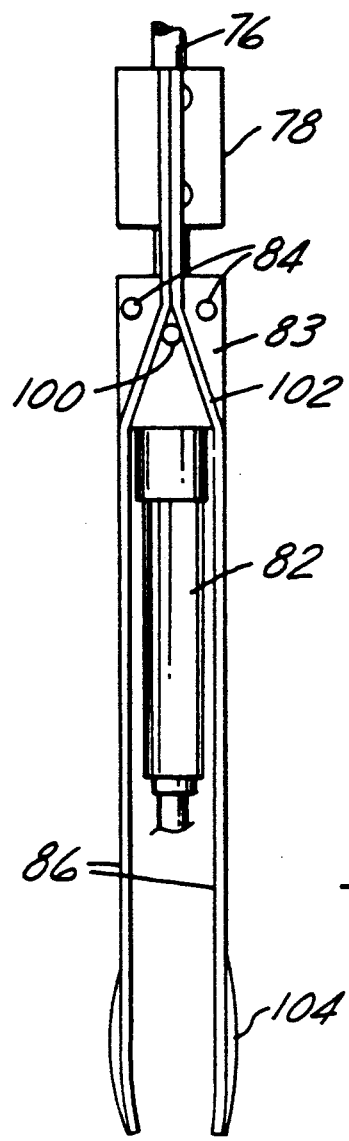
FIG. 11 is a view showing the gripper arms in a release position.
Figure 12:
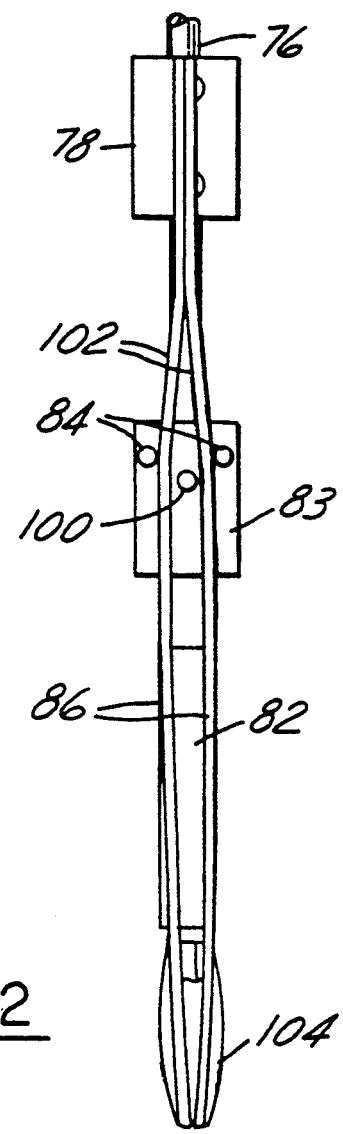
FIG. 12 shows the gripper arms in the gripping position.

FIGS. 11 and 12 show the action of the gripper arms 86. As shown, lower block 83 includes two outer pins 84 and an inner pin 100. Gripper arm 86 includes upper angled portions 102, and a lower gripper portions 104. Gripper portions 104 are cupped to gently grip the seedling. Further, the curved gripper portions 104 ensure that the seedling is gently and safely moved into the compartment in tile plant tray. As sixown in FIG. 11, gripper portions 104 are in a released position. Inner pin 100 has moved upwardly between tile angled portions 102, to force the angled portions 102 apart. This in turn retains the gripper portions 104 apart.

As shown in FIG. 12, lower block 83 has been moved downwardly along rod 76. In one embodiment the total downward stroke was adjustable to a max 1". Outer pins 84 have now cammed the angled portions 102 towards each other, in turn moving gripper portions 104 towards each other. It is this action that allows the gripper arms to gently grip a plant.

It is preferred that gripper head 24 and pusher assembly 26 return to retracted, gripper open, and a home position at s tart-up, or shut-dowel, to simplify the necessary controls. The "home" position is preferably at the center of travel. Since the home position is in the center of travel, the gripper head moves through the home position on its way to the plant tray. The home position sensor can then provide a feedback of the actual gripper head position to a controller. Further, when the gripper head moves through tile home position, the sensor can provide an actuation signal to the photo eye. If the home position sensor were at an end of travel, these function would require additional sensors.

Now, referring to FIGS. 1-11, when it is desired to move plants from a seedling tray 46 to a plant tray 54, the gripper head 24 and pusher assembly 26 are moved beneath a particular compartment in the seedling tray. A first seedling is removed from a seedling compartment by the pusher assembly 26, and is then gripped by the gripper head 24. The pusher assembly 26 is retracted. The seedling is then moved over the plant tray 54. The photo eye checks for a seedling, preferably after the gripper head clears the seedling tray. If necessary, the gripper head is rotated for a triangular plant tray, and gripper head 24 places the plug into a compartment in the plant tray 54. Water may be injected to facilitate this planting. An adjustable stop may be used on gripper head 24 to control planting depth. The plant tray 54 is preferably at a lower vertical position than the seedling tray 46, since it is necessary to move subsequent plants over the previously positioned plants in the plant tray 54.

The order of removing the seedlings may be easily varied by controlling motor 34, in combination with the conveyors 42 and 50. As an example, it may be desirable to begin removing all of the seedlings from the rightmost row of tray 46. In this way, the forwardmost and rightmost seedling would be initially removed. The seedling would then be transplanted into a compartment in plant tray 510. The seedling tray 46 may then be indexed forwardly such that the head 24 and pusher assembly 26 are now aligned with the second forwardmost and rightmost compartment. Such a procedure might be useful for removing very leafy plants. By moving straight across the forward row, some plants may experience damage to their leaves. For other plants it may be easier to first move across the entire front row. A particular order can be easily controlled due to motor 34, which is interfaced with a control for the conveyors. Movement of the conveyors and the motor 34 is thus easily controlled to remove plants in any order or at any speed.

The controller receives inputs from each gripper head from the following components: a gripper head up proximity switch, a pusher spring up proximity switch, a zero or home position proximity switch, and a tooth counting proximity switch associated with motor 34 for determining the position of the head, and the pusher spring. Further, the processor also receives the following input signals: a power-on/off, a start, an emergency stop, a reset, a cycle start for cyclically removing plants from an entire tray, a single step input for manually overriding the cycle system, and removing a single plant, a head select position for the single step, and a tray-type input received from both the seedling and plant trays, which may be inputted from a keyboard. The processor sends the following outputs: a gripper head up/down signal to the proper cylinder, a gripper head signal to move the gripper head to the gripping or release position to the proper cylinder, a wrist pivot signal to the proper cylinder, a pusher spring up/down signal to the proper cylinder, a signal to motor 34 to rotate clockwise, a signal to motor 34 to rotate counterclockwise, a motor brake on signal and a water spray signal. In one embodiment, an Allen Bradley SLC-500 processor was utilized to control these various functions. The controller is preferably programmable by manual entry into an input keypad to vary the types and sizes of seedling and plant trays.

Solenoid controls are preferably positioned adjacent to the cylinders to control fluid flow to and from the cylinders. The controller controls the solenoid controls such that the cylinders are operated as needed.

FIG. 13a shows an alternative pusher embodiment 130. Spring arms 132 utilized with this embodiment are similar to the previously discussed spring arms. A central spike 134 is positioned between the spring arms and acts to secure the seedling. As can be seen in FIG. 13b, as the spring arms 132 cross beneath the seedling plug 136, shown schematically, the seedling remains on the spike 134. This ensures the seedling will be properly positioned above the compartment such that the gripper head can easily grip the seedling. The spike is not actually lifting the seedling, rather the spring arms do the lifting. The function of the spike is to prevent the seedling from falling off of the spring arms, once it has been removed from the compartment. In one embodiment, the spike was formed of 0.050" wire while the arms were formed of 0.070" spring wire. The spike 134 extended for one half of an inch above the tips of the spring arms, when the spring arms were in the relaxed position.

Further embodiments of the present invention are shown in FIG. 14. As shown, a frame 112 has gripper heads 114 and 116 on both lateral side, with associated pusher assemblies. Gripper heads 114 and 116 would each be independently controlled and operating to remove plants from seedling trays and transplanting them into plant trays. This doubles the speed of the system. Further, a second frame 18 having gripper heads 120 may also be utilized. It is also envisioned that further multiples of the frames can be utilized. In this way, seedling trays 122 on a platform 124 can be quickly transplanted to plant trays 126 on a platform 128, with several of the trays being transplanted at a single time.

Preferred embodiments of the present invention have been disclosed, however, a worker of ordinary skill in the art would recognize that certain modifications would come within the scope of this invention. For that reason the following claims should be studied in order to determine the true scope and content of this invention.

I claim:
1. A plant transplant system comprising:
   a frame extending along a longitudinal axis;
   a gripper head selectively actuatable to grip or release a plant, said gripper head being movable longitudinally along said frame;
   a pusher assembly, said pusher assembly being selectively actuatable to push seedlings out of a compartment on a seedling tray where they can then be gripped by said gripper head, said pusher assembly being movable longitudinally along said frame; and
   a seedling conveyor for conveying seedling trays laterally mounted between said gripper head and said pusher assembly, and a plant tray conveyor for conveying plant trays laterally also mounted between said gripper head and said pusher assembly.
2. A transplant system as recited in claim 1, wherein a timing mechanism moves said gripper head and said pusher assembly together longitudinally along said frame.
3. A transplant system as recited in claim 1, wherein a sensor determines whether a live seedling is in a plug removed from the seedling tray.
4. A transplant system as recited in claim 1, wherein said seedling conveyor is positioned vertically above said plant conveyor.
5. A transplant system as recited in claim 1, wherein said gripper head consists of two gripper arms, and a selectively adjustable plurality of pins which move relative to said gripper arms to cam said gripper arms to gripping and releasing positions.
6. A transplant system as recited in claim 5, wherein said gripper arms have generally parallel lower portions, and upper angled portions, said pins consisting of two outer pins positioned outwardly of said angled portions and an inner pin positioned between said angled portions, movement of said outer pins downwardly along said angled portions causing said parallel lower portions to be forced together to grip a plant, and movement of said inner pin upwardly between said angled portions causing said angled portions to move away from each other, and in turn causing said gripper portions to move away from each other.

7. A transplant assembly as recited in claim 1, wherein said pusher assembly consists of two spring arms having generally parallel lower portions, and upper angled portions which extend to end points which are relatively adjacent to each in a relaxed position, movement of said spring arms into a drainage hole of a seedling tray causing said angled portions to be forced across each other, thus sweeping a seedling plug out of a seedling tray compartment.

8. A transplant assembly as recited in claim 7, wherein said end points have chamfered ends to reduce damage to a plant.

9. A transplant assembly as recited in claim 1, wherein said gripper head pivots about a vertical axis relative to said frame, said pivoting allowing said gripper head to align itself with various orientations of tray compartments.

10. A transplant assembly as recited in claim 1, wherein said frame consists of two lateral sides, and gripper heads mounted on each lateral side of said frame.

11. A transplant assembly as recited in claim 10, wherein said system consists of plural ones of said frames spaced laterally along said conveyors.

12. A transplant assembly as recited in claim 1, wherein said system consists of plural ones of said frames spaced laterally along said conveyors.

* * * * *

UNITED STATES PATENT AND TRADEMARK OFFICE
CERTIFICATE OF CORRECTION

PATENT NO. : 5,320,649
DATED : June 14, 1994
INVENTOR(S) : Holland, James J.

It is certified that error appears in the above-indentified patent and that said Letters Patent is hereby corrected as shown below:

Column 6, line 57 of the Patent delete "adjustable" and insert --actuatable--

Signed and Sealed this

Sixth Day of September, 1994

Attest:

BRUCE LEHMAN

Attesting Officer

Commissioner of Patents and Trademarks